A. TEITEL.
FILM CLEANER AND REWINDER.
APPLICATION FILED FEB. 27, 1920.

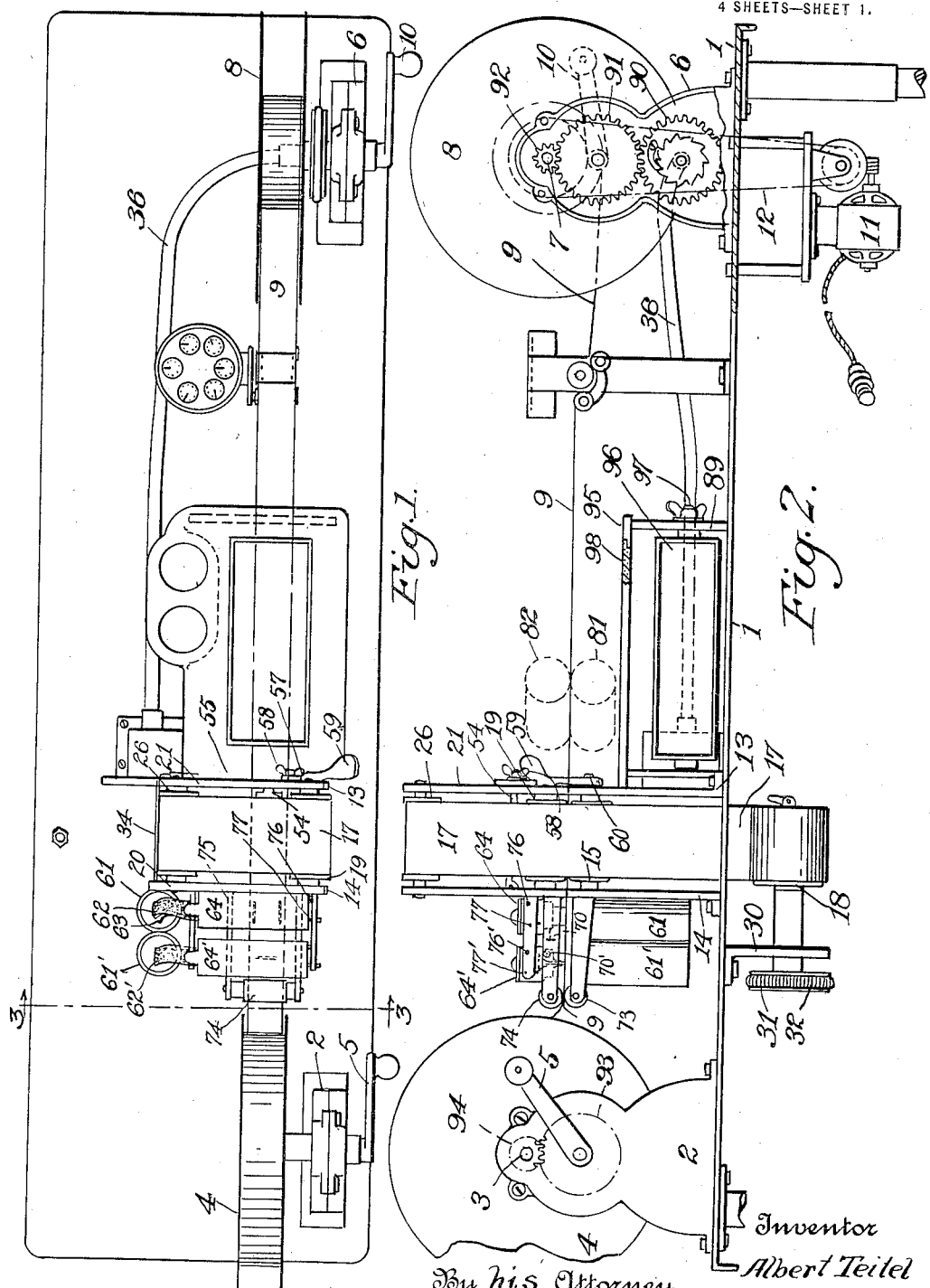

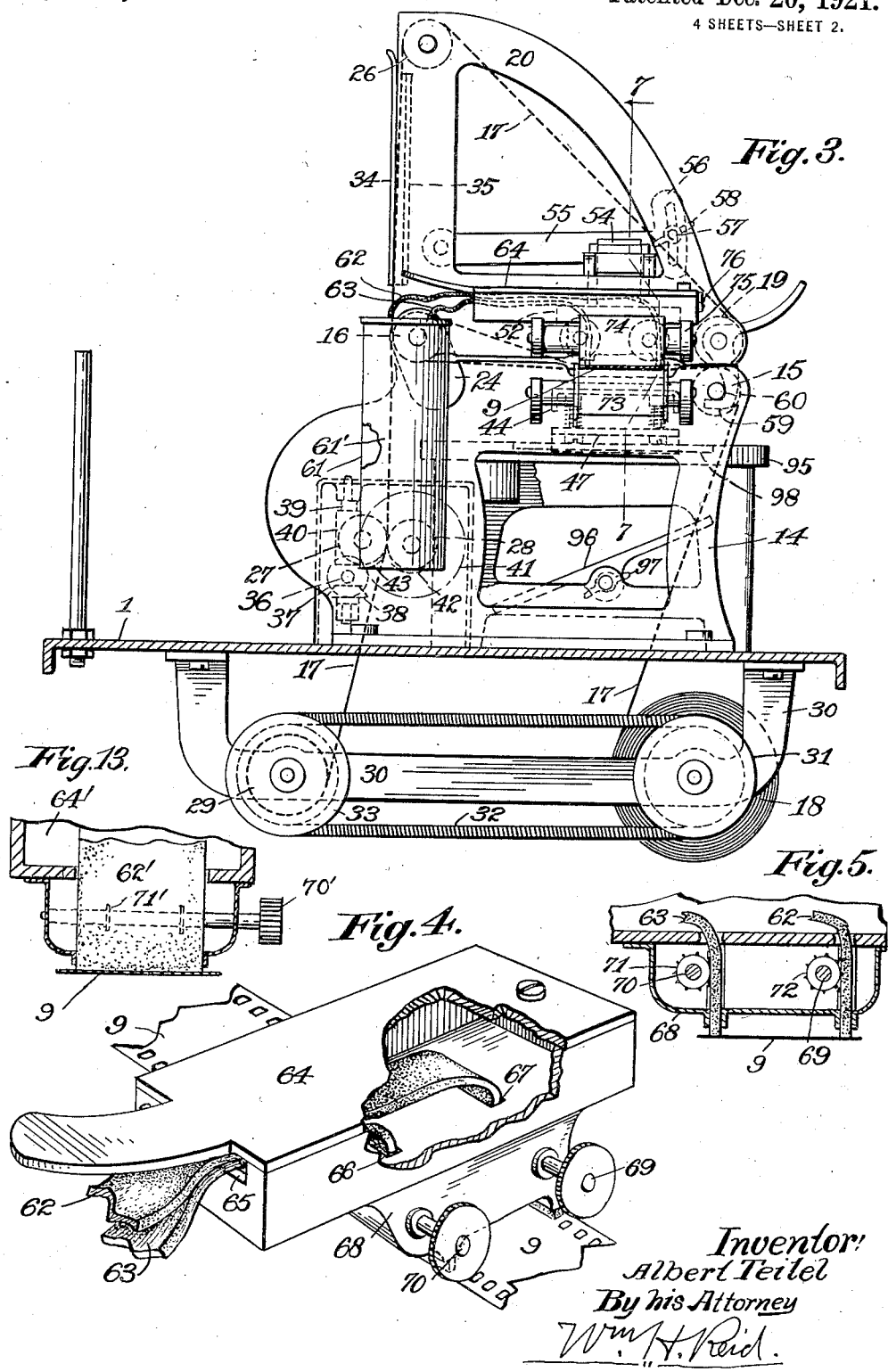

1,401,013.

Patented Dec. 20, 1921.
4 SHEETS—SHEET 3.

Inventor:
Albert Teitel
By his Attorney
Wm H. Reid.

A. TEITEL.
FILM CLEANER AND REWINDER.
APPLICATION FILED FEB. 27, 1920.
1,401,013.
Patented Dec. 20, 1921.
4 SHEETS—SHEET 4.
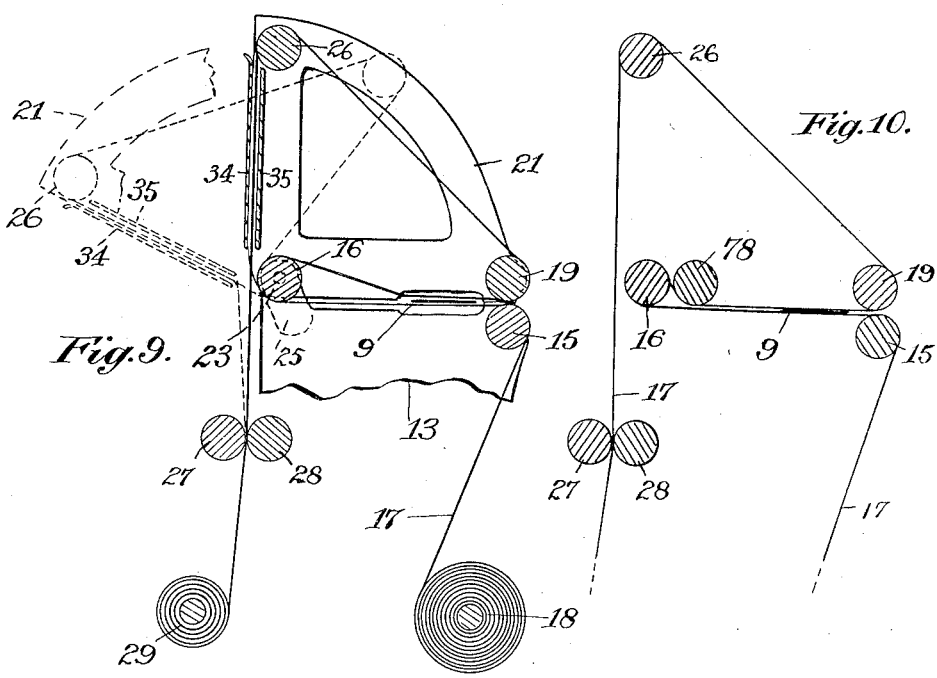
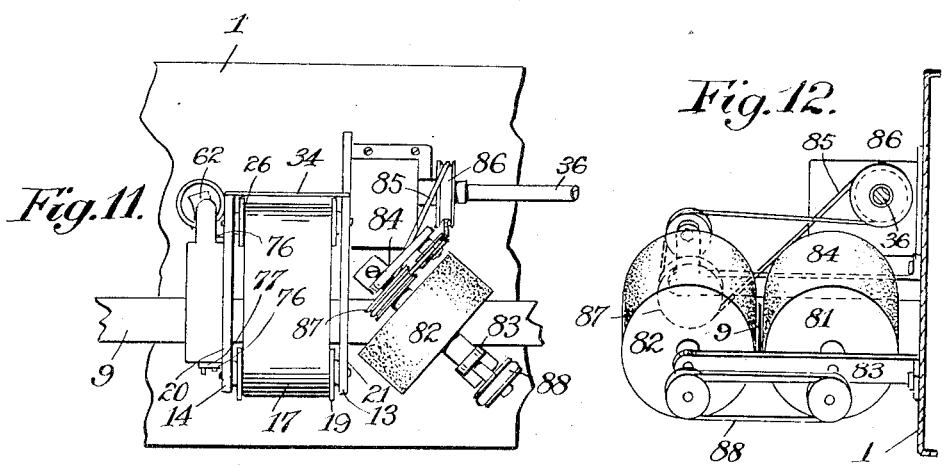
Inventor
Albert Teitel
By his Attorney
Wm. H. Reid.

UNITED STATES PATENT OFFICE.

ALBERT TEITEL, OF NEW YORK, N. Y., ASSIGNOR TO CINEMA PATENTS COMPANY, OF CHICAGO, ILLINOIS, A PARTNERSHIP.

FILM CLEANER AND REWINDER.

1,401,013.   Specification of Letters Patent.   Patented Dec. 20, 1921.

Application filed February 27, 1920. Serial No. 361,771.

*To all whom it may concern:*

Be it known that I, ALBERT TEITEL, a citizen of the United States, and resident of New York, in the county of Bronx and State of New York, have invented certain new and useful Improvements in Film Cleaners and Rewinders, of which the following is a specification.

The object of the present invention is to provide an apparatus that will rewind a motion picture film from one reel to another, and at the same time will serve to clean the film, by cleaning means that is caused to move in a direction transverse to the path of movement of the film.

A further object of the invention is to provide in such an apparatus, cleaning means that will travel transversely to the film and which will engage both sides of the film, and preferably at opposite places; and which cleaning means in one form consists of a web that will pass transversely across one face of the film and then return and travel transversely across the opposite face of the film.

A still further object is to provide in such an apparatus as set forth, resilient means for pressing the cleaning member or web against one or both faces of the film by special pressing means in the nature of a piece of fur.

Another object of the invention is to provide in the arrangement a cleaning web that engages opposite faces of the film, means for lifting the cleaning web from one face of the film when the cleaning operation is stopped, to give access to the film and to permit removal and replacement of the film.

Another object of the invention is to provide in connection with the described cleaning means for the film, means for engaging perforated margins of the film only by lubricating members, that will apply a lubricating fluid to the margins of the film, and preferably before engagement by the cleaning member or web; and which lubricating means will be removed from the film by the act of lifting the upper cleaning member.

A further object of the invention is to provide means for measuring the film as it is advanced between the reels after being cleaned, to provide a record of the actual work done by the apparatus.

Another object of the invention is to provide between the cleaning apparatus and the winding reel, a kind of table with an illuminated surface over which the film passes, to facilitate inspection of the film by the operator, whereby blemishes in the film, and its general condition will be readily ascertained.

In the accompanying drawings showing embodiments of my invention, Figure 1 is a plan view of the apparatus.

Fig. 2 is a side elevation.

Fig. 3 shows enlarged a section on the line 3—3 of Fig. 1.

Fig. 4 is a fragmentary view, partly broken away, showing part of the lubricating means.

Fig. 5 is a section through the latter.

Figs. 9 and 10 are diagram views showing the movement of the web.

Figs. 11 and 12 show enlarged an additional form of cleaning means for the film.

Fig. 13 shows a modified form of lubricating device.

Figure 6:
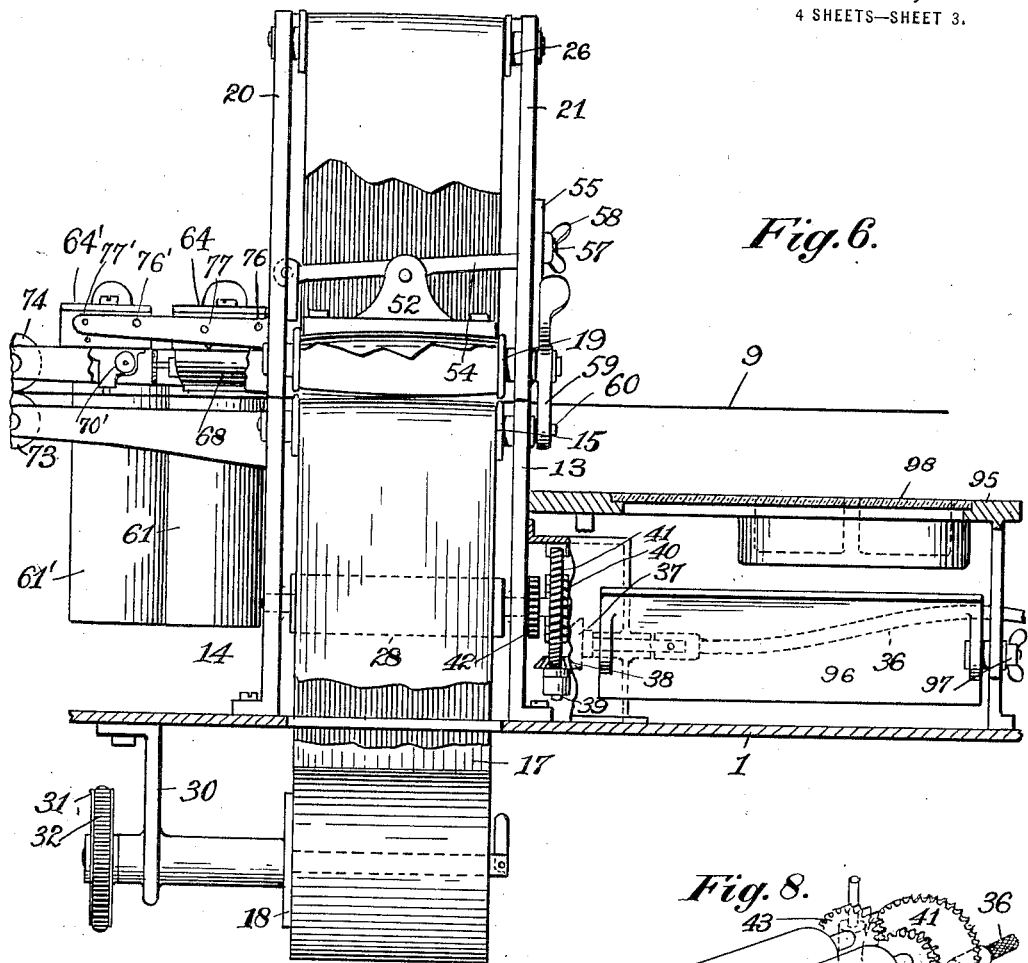
Fig. 6 shows enlarged a side elevation partly in section.

The apparatus is shown mounted on a suitable base 1, having at one end a support 2 for a shaft 3 to receive the conventional film reel 4, which shaft may have a handle 5 connected by gears 93, 94, that are released by endwise movement. On the opposite end of the machine is a support 6 carrying a shaft 7 for receiving a conventional reel 8 on which the film 9 is wound, and drawn from the reel 4. The shaft 7 may be rotated by a handle 10 that may have its gear connection loosened if moved endwise. This is to permit rotation of the shaft 7 from a motor 11 by belt 12.

As the film 9 passes from reel 4 to reel 8 it moves across a supporting member formed of two uprights 13, 14. Between these members rotate rolls 15 and 16, located on opposite sides of the path of travel of the film 9. A suitable cleaning member, such as a web 17 is carried by a reel 18 below the base 1, and passes upward and around the guide roll 15, thence transversely across beneath the film 9, and around the guide roll 16. By running the film from reel 4 to reel 8, and drawing the web 17 across beneath the film, and pressing the web and film together, the film will be cleaned by the web by its frictional contact therewith, and the feeding of the web will cause it to continually present a fresh cleaning surface to the film.

In order to clean the opposite face of the film at the same time, the web 17 is passed around the guide roll 16 and then back transversely across the upper face of the film 9, and then around a guide roll 19 shown arranged above the guide roll 15. This roll 19 is mounted on a frame formed of side plates 20, 21, suitably connected by cross members, which frame is pivoted at 22, 23, see Fig. 7, to swing in the axis of the guide roll 16, that is mounted on suitable ears 24, 25. After the web passes around the guide roll 19 on the frame 20—21, it passes upwardly around a guide roll 26 on the frame, and thence downwardly between a pair of feed rolls 27, 28; and thence to a take-up roll 29. The latter roll, together with the roll or reel 18 are carried by a bracket 30 below the base 1. The shaft of the roll 18 carries a pulley 31, from which a belt 32 passes to a pulley 33 secured to the reel 29; such belt being of the slip variety, whereby the unwinding of the reel 18 as the film is drawn therefrom, will rotate the roll 29 and serve as a take-up for the web as fed downwardly by the feed rolls 27—28.

From this arrangement it will be understood that the feed rolls will pull the web downwardly around the top guide roll 26, and it will be drawn around the guide roll 19, across the top of the film from the guide roll 16, and to the latter across the bottom of the film from the roll 15, and upward from the supply reel 18; being wound on the take-up roll 29 as set forth. Since the frame 20—21 can swing on the axis of the roll 16, by swinging this frame, as indicated in Fig. 9, the portion of the web between the roll 16 and the roll 19 will be raised from the top of the film. This will permit access to the film, for replacement, when one film has been fed across between the web portions. If desired guide plates 34, 35, may be provided on the swinging frame for the web as it moves downward.

Figure 8:
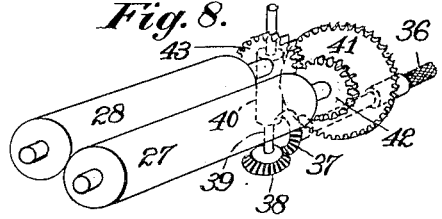
Fig. 8 is a detail showing means for operating the feed rolls.

Means are provided for actuating the feed rolls 27, 28, preferably, from the means that rotates the winding reel 8. The shaft 7 for this reel is connected by gears 90, 91, 92, with a flexible shaft 36, see Fig. 1, that carries a beveled gear 37, see Fig. 8, engaging a gear 38 on an upright shaft 39. The latter carries a worm 40 meshing with a worm wheel 41 fast to the feed roll 27. A gear 42 fast to the feed roll 27 meshes with a gear 43 fast to the feed roll 28. This will cause the web 17 to be drawn downwardly, and thereby caused to move transversely across both faces of the film, as set forth.

Figure 7:
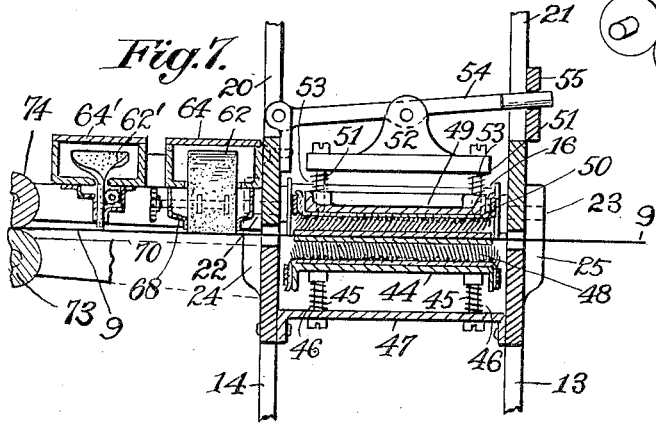
Fig. 7 is a vertical section on the line 7—7 of Fig. 3.

Suitable means are provided for pressing the portions of the web passing back and forth across the two faces of the film, in contact therewith, which means are preferably resilient, and which are caused to have a suitable action on the web, to press it against the film, to clean the film yet not have any injurious action thereon. This yieldable means is shown arranged in duplicate, one part being mounted between the uprights 13, 14, and permanently located; while the other member is carried by the swinging frame 20—21; so that when the frame is swung upwardly as set forth it will lift the yieldable pressing means, and will maintain its position relative to the moving web. A plate 44 is vertically movable on suitable guide pins 45, 45, and presses upwardly by coil springs 46 on such pins, which pins are carried by a cross plate 47 secured to the uprights 13, 14. While this guide plate 44 is resilient by its spring support, I have found that excellent results are obtained by placing a piece of fur 48 on this plate 44, with the hair side in engagement with the web portion that passes across below the film from roll 15 to roll 16. A similar arrangement is provided and carried by the frame 20—21. A plate 49 lined with the piece of fur 50, is supported by pins 51 carried by the block 52, and pressed downwardly by springs 53 from the block 52. One of these resilient members is preferably adjustably connected with its support, and as shown in Fig. 7, the block 52 is mounted on a lever 54 hinged to the frame 20, the other end of the lever engaging a swinging arm 55 pivoted on the upright 21. The arm 55 has a slotted end 56, that is locked to the upright 20 by a bolt 57 and wing nut 58, see Figs. 3 and 6. This will permit adjustment of the resilient means engaging the outer faces of the reversely moving web portions, yet one of the pressing means will be elevated from the film when the frame is swung over. This frame is shown as locked in its normal position by a hook lever 59 and engaging a pin 60 on the upright 13. It will be seen that one of these pressing members will engage the lower face of the lower web portion, while the upper pressing member will engage the upper return portion of the web, and press both of these web portions against opposite portions of the film, as it travels transversely across between the web portions. This will cause fresh portions of the web to be continually presented to the moving film as it travels from reel to reel. Because the web travels transversely across the film, a much wider web can be employed than in constructions heretofore used where the web was caused to travel parallel with the movement of the film, and only a web as wide as the film would operate. Because of the considerable width of this web it can therefore travel at a much slower speed than in the said construction.

In connection with the described means for cleaning the film on both faces by a transversely moving cleaning member, I provide means for applying a lubricant to the perforated margins only of the film. These margins engage suitable sprockets in the projecting apparatus, and the high speed of such sprockets that move intermittently tend to injure the delicate film, so that suitable lubricating fluid is needed. This lubricant I preferably apply to the film between the unwinding reel and the cleaning web, so that any surplus amount will be removed. This cleaning fluid may also have a certain good effect in assisting in cleaning the interior surface of the film containing the images that are projected. As shown, I arrange a suitable tank 61 carried by the upright 14, that receive a pair of absorbent webs or wicks 62, 63. These are caused to enter a suitable receptacle 64 preferably carried by the frame 20, and which wicks pass through the receptacle from inlet slots 65, to outlet slots 66, 67. A frame 68 on the bottom of the receptacle 64 carries spindles 69, 70, having toothed rolls 71, 72, that engage the wicks and feed them downwardly through the bottom of the frame 68. The projecting ends of the wicks will be located in the path of the film, passing between guide rolls 73, 74, and the resilient pressing members set forth, that will thereby engage the margins of the film, and apply the lubricating fluid thereto. This fluid contained in the tank 61 will be absorbed by the wicks and applied to the film margins. It will be understood that this receptacle 64 is carried by the swinging frame 20—21, the upper guide roll 74 is carried by the arm 75 on this swinging frame. The receptacle 64 is shown as hinged at 76 to the frame member, and can be swung upwardly when desired, that will remove the wicks from the film, and the device can be operated as a cleaning mechanism only, without applying the lubricant to the film margins. A spring arm 77 engages the receptacle 64 to hold it in the two said positions.

If desired this wick arrangement may be caused to engage the entire face of the film, by arranging a wick 79, see Fig. 13, passing through a suitable holder 80 similar to the receptacle 64, but which will extend transversely across the film and engage its entire upper face. By this means a suitable cleaning fluid may be caused to engage the upper side of the film.

In Fig. 10, I show a diagram in which an additional guide roll 78 is provided beyond the guide roll 16 to bring the upper reversely moving portion of the web in close engagement with the film on its upper face.

In Figs. 11 and 12, I show an additional form of cleaning means, that engages one or both faces of the film transversely to its path of movement, and which is arranged diagonally at about an angle of forty-five degrees, to the path of the film at the place of engagement. In these views I show a pair of cleaning rolls 81, 82, carried by arms 83, 84, from the base. A belt 85 driven from a pulley 86 on the shaft 36, engages a pulley 87 on the roll 82. A belt 88 serves to drive the roll 81 from the roll 82. By arranging these rolls diagonally relative to the film as shown, and making them of suitable width, the opposite adjacent portions of the rolls will engage the film on opposite sides of a diagonal line or surface that will extend from one edge of the film to the other. The rotation of these rolls will present a fresh surface to the film, and the film will be cleaned as the rolls rotate, and the film is advanced. Obviously the cleaning web may be omitted and the rolls alone employed, which rolls engage the moving film on opposite sides, and have a movement at the place of engagement that is transverse or diagonal to the path of movement of the film.

On the base 1 beyond the web support 13 I arrange a frame 95 supported on uprights 89, 89, in which frame is a large opening containing a plate of glass 98, that may be rough or frosted if desired. I further provide means for illuminating this glass plate, and I show an adjustable mirror 96 clamped by a bolt 97. This is shown in Fig. 2 set at an angle to reflect light from an outside location onto the glass plate. The operator will view the film 9 passing above this glass plate, that will serve to illuminate the film so that it can be readily inspected.

In the construction shown I also provide means for applying a cleaning fluid to the film, and preferably before it engages the cleaning web 9. A wick or tape 62' is carried by a box 64' supported on arms 98, 99, which wick passes downwardly into a tank 61'. This tank contains any suitable cleaning fluid such as chlorethelene. The wick can be adjusted by a suitable toothed roll 70' and engages the upper surface of the film 9, preferably extending over the interior portion between the perforated margins, not engaging the latter. The box 64' can be swung up on its pivotal support 76', and held in adjusted position by spring pins 77' that hold the box in two positions. The spring 77 permits the box 64 to swing on pivots 76. Therefore either of the wicks 62', or 62, 63, can be caused to be held above the film. By these means the film can be engaged at the interior only by the cleaning fluid wick, and then cleaned by the web; or the film can be engaged at its margins only by the two wicks that apply a lubricating fluid such as paraffin oil or the like. Or if desired the film can be engaged by both of these sets of wicks and then cleaned.

What I claim is:—

1. In a film cleaning machine, means for advancing the film in a certain path, a cleaning web, means for moving the web in engagement with one face of the moving film and in a path transverse to the said film path of movement at the place of engagement, and means for guiding the same web to return and move in the reverse direction against the opposite face of the film at said place of engagement.

2. In a film cleaning machine, means for advancing the film in a certain path, a cleaning web, means for moving the web in engagement with one face of the moving film and in a path transverse to the said film path of movement at the place of engagement, means for guiding the same web to return and move in the reverse direction against the opposite face of the film at said place of engagement, and means engaging the web on each side to press the web against the film.

3. In a film cleaning machine, a base, means on the base for advancing the film in a certain path, a cleaning web, means on the base for causing web to move across the lower face of the film and the same web to travel back across the upper face of the film.

4. In a film cleaning machine, means on the base for advancing the film in a certain path, a cleaning web, means on the base for causing the web to move across the lower face of the film and the same web to travel back across the upper face of the film transversely thereto.

5. In a film cleaning machine, means on the base for advancing the film in a certain path, a cleaning web, means on the base for causing the web to move across the lower face of the film and to travel back across the upper face of the film, such means including a hinged frame that can swing up to lift the web beyond the upper face of the film.

6. In a film cleaning machine, a base, means on the base for advancing the film in a certain path, a cleaning web, means on the base for causing the web to move across the lower face of the film and to travel back across the upper face of the film, such means including a hinged frame that can swing up to lift the web beyond the upper face of the film, a lower pressing member on the base at said place of engagement of the film and web, and an upper pressing member carried by the said hinged frame opposite said lower pressing member whereby the web may be held against both faces of the film by such pressing means or the upper pressing means may be raised by the frame with the upper film-engaging web portion.

7. In a film cleaning machine, a base, means on the base for advancing a film in a certain path, a cleaning web, means on the base for causing the web to move across the lower face of the film and to travel back across the upper face of the film transversely thereto, such means including a hinged frame that can swing up to lift the web beyond the upper face of the film, a lower pressing member on the base at said place of engagement of the film and web, and an upper pressing member carried by the said hinged frame opposite said lower pressing member whereby the web may be held against both faces of the film by such pressing means or the upper pressing means may be raised by the frame with the upper film-engaging web portion, one said pressing member having an adjustable resilient connection.

8. In a film cleaning machine, a base, means on the base for advancing a film in a certain path, a cleaning web, means on the base for causing the web to move across the lower face of the film and to travel back across the upper face of the film transversely thereto, such means including a hinged frame that can swing up to lift the web beyond the upper face of the film, a lower pressing member on the base at said place of engagement of the film and web, and an upper pressing member carried by the said hinged frame opposite said lower pressing member whereby the web may be held against both faces of the film by such pressing means, or the upper pressing means may be raised by the frame with the upper film-engaging web portion, the said frame-carried pressing member having an adjustable resilient connection with the frame.

9. In a film cleaning machine, means on the base for advancing the film in a certain path, a cleaning web, a pair of rolls on the base for causing the web to move across the lower face of the film, a hinged frame, a roll on the frame above one of said base rolls with the web passing around said other base roll and then the film and around the frame roll, a roll on the upper part of the frame around which the web next passes, opposed driving rolls on the base below the second mentioned base roll on the base to pull the film downwardly from said upper roll on the frame, said frame when swung upwardly causing the upper web portion to be lifted from the film path.

10. In a film cleaning machine, means on the base for advancing the film in a certain path, a cleaning web, a pair of rolls on the base for causing the web to move across the lower face of the film, a hinged frame, a roll on the frame above one of said base rolls with the web passing around said other base roll and then the film and around the frame roll, a roll on the upper part of the frame around which the web next passes, opposed driving rolls on the base below the second mentioned base roll on the base to pull the film downwardly from said upper roll on the frame, said frame when swung upwardly causing the upper web portion to be lifted from the film path, a supply roll on the base for the web, a take-up roll on the base beyond said feed rolls, and means for causing the unwinding of the supply roll to wind up the film on the take-up roll.

Signed at New York city, N. Y. on February 24th, 1920.

ALBERT TEITEL.